(12) United States Patent
Bedard et al.

(10) Patent No.: US 7,124,846 B2
(45) Date of Patent: *Oct. 24, 2006

(54) SIDE PANEL FOR A SNOWMOBILE

(75) Inventors: Yvon Bedard, Orford (CA); Jean-François Desmarais, Racine (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/998,540

(22) Filed: Nov. 30, 2004

(65) Prior Publication Data

US 2005/0072614 A1  Apr. 7, 2005

Related U.S. Application Data

(63) Continuation of application No. 10/609,405, filed on Jul. 1, 2003, now abandoned, which is a continuation-in-part of application No. 09/877,190, filed on Jun. 11, 2001, now Pat. No. 6,981,564.

(60) Provisional application No. 60/430,096, filed on Dec. 2, 2002.

(51) Int. Cl.
*B62D 27/00* (2006.01)

(52) U.S. Cl. ............ 180/182; 180/69.2; 180/69.24

(58) Field of Classification Search ............ 180/69.2, 180/69.24, 182, 186, 190
See application file for complete search history.

(56) References Cited

U.S. PATENT DOCUMENTS

| | | | |
|---|---|---|---|
| 1,963,273 A | 6/1934 | Kellogg | |
| 2,656,904 A | 10/1953 | Grenier | |
| 2,732,581 A | 1/1956 | Heck | |
| 2,746,081 A | 5/1956 | Gershen | |
| 3,572,813 A * | 3/1971 | Takada | 296/193.12 |
| 3,583,506 A | 6/1971 | Preble | |
| 3,583,507 A | 6/1971 | Trautwein | |
| 3,622,196 A | 11/1971 | Sarra | |
| 3,627,073 A * | 12/1971 | Grimm | 180/271 |
| 3,981,373 A | 9/1976 | Irvine | |
| 4,008,777 A * | 2/1977 | Juto et al. | 180/182 |
| 4,204,581 A | 5/1980 | Husted | |
| 4,204,582 A | 5/1980 | Van Soest | |
| 4,322,107 A | 3/1982 | Ishizuka et al. | |
| 4,337,529 A | 6/1982 | Morokawa | |
| 4,502,560 A | 3/1985 | Hisatomi | |
| 4,613,006 A | 9/1986 | Moss et al. | |
| 4,633,964 A | 1/1987 | Boyer et al. | |
| 4,699,229 A | 10/1987 | Hirose et al. | |

(Continued)

OTHER PUBLICATIONS

Pictures of a 1990 Arctic Cat Prowler Snowmobile, Pictures 1-4.

(Continued)

*Primary Examiner*—Kevin Hurley
(74) *Attorney, Agent, or Firm*—Osler, Hoskin & Harcourt LLP

(57) ABSTRACT

A snowmobile includes a side panel that is mounted to the snowmobile's frame about a generally vertically extending side panel axis. In a closed position, the side panel protects and encloses a lateral side of the snowmobile's engine. In an open position, the side panel facilitates easy access to the engine. The side panel includes a lower leg support that includes a knee rest, a lower front leg support, and an inner leg support. The lower leg support improves the rider's comfort and ability to actively position himself on the snowmobile. The snowmobile also includes a rewind starter operatively connected to the engine. The rewind starter is accessible through a hole formed in the side panel.

21 Claims, 10 Drawing Sheets

U.S. PATENT DOCUMENTS

| | | | |
|---|---|---|---|
| 4,848,498 A | 7/1989 | Hart et al. | |
| 4,848,503 A | 7/1989 | Yasui et al. | |
| 5,036,931 A | 8/1991 | Iritani | |
| 5,152,365 A * | 10/1992 | Aoshima | 180/68.3 |
| 5,370,198 A | 12/1994 | Karpik | |
| 5,474,146 A | 12/1995 | Yoshioka et al. | |
| 5,495,910 A | 3/1996 | Stauffer et al. | |
| 5,564,517 A | 10/1996 | Levasseur | |
| 5,660,245 A | 8/1997 | Marier et al. | |
| 5,685,387 A | 11/1997 | Rioux et al. | |
| 5,782,312 A | 7/1998 | Murakawa | |
| 5,944,133 A | 8/1999 | Eto | |
| 6,099,097 A | 8/2000 | Hocker et al. | |
| 6,234,263 B1 | 5/2001 | Boivin et al. | |
| 6,276,482 B1 | 8/2001 | Moriya et al. | |
| 6,371,233 B1 * | 4/2002 | Ishii | 180/182 |
| 6,446,744 B1 * | 9/2002 | Wubbolts et al. | 180/190 |
| 6,561,297 B1 * | 5/2003 | Yatagai et al. | 180/190 |

OTHER PUBLICATIONS

Pictures of a 1992 Yamaha V-Max-4 Snowmobile, Pictures 5-9.

* cited by examiner

SIDE PANEL FOR A SNOWMOBILE

CROSS-REFERENCE

This application is a continuation of U.S. patent application Ser. No. 10/609,405 filed on Jul. 1, 2003 now abandoned, this application is also a continuation-in-part of U.S. patent application Ser. No. 09/877,190 filed on Jun. 11, 2001 now U.S. Pat. No. 6,981,564, both of which are incorporated herein by reference. Through U.S. patent application Ser. No. 10/609,405, this application also claims the benefit of priority to U.S. Provisional Application No. 60/430,096, titled "SIDE PANEL FOR A SNOWMOBILE," filed Dec. 2, 2002, which is incorporated by reference herein in its entirety.

BACKGROUND OF THE INVENTION

1. Field of the Invention

This invention relates to the fairings, engine covers, and rider supports of vehicles such as snowmobiles.

2. Description of Related Art

Unless otherwise expressly stated, all dimensions for snowmobile riders are based on a standard rider, who is defined by a $50^{th}$-percentile United States human male who weighs 78 kilograms (174.8 lb.) and has the dimensions shown in FIGS. 7 and 8. As would be obvious to one of ordinary skill in the art, the dimensions illustrated in FIGS. 7 and 8 are in centimeters with the middle values representing the $50^{th}$-percentile U.S. human male. Similarly, all positioning of the riders is based on the positioning of a standard rider on a snowmobile in a standard position. In the standard position, the rider is seated on the seat, is holding the steering device with his hands, and has his feet on the footrest. Accordingly, the rider has the position shown in the Figures (i.e., in the approximate position of a rider a few seconds after starting the vehicle, heading straight ahead on a flat terrain).

As illustrated in FIG. 9, conventional snowmobiles 10 share a common construction: they combine features and elements so that the snowmobile rider 20 sits in a generally upright position on a seat 30 in a location toward the rear of the snowmobile 10. When the rider 30 is seated in this generally-relaxed fashion, the seat 30, a footrest 40, and a steering device (such as a handlebar) 50 support all of the forces that the rider 30 exerts on the snowmobile 10.

The snowmobile 10 includes a frame 60 that supports a motor 70 (e.g., an internal combustion engine, etc.). The motor 70 is operatively connected to an endless drive track 80 that is also supported by the frame 60. Two steering skis 90 are operatively connected to the steering device 50 to enable the rider 20 to steer the snowmobile 10.

An engine cover 100 (or fairing) pivotally mounts to the frame 60 about a laterally extending engine cover axis 110. The engine cover 100 is selectively movable between a closed position (FIG. 9) that encloses and protects the motor 70 and an open or raised position (FIG. 10) that allows access to the motor 70 and/or other interior compartments of the snowmobile 10.

When the motor cover 100 is closed, its lower edges mate with upper edges of a motor pan 120 that protects and encloses a lower portion of the motor 70. Whenever maintenance is to be performed on the engine or the components inside the motor pan 120, the user must bend over the upward extending side portions of the motor pan 120. Also, since the motor pan is not removable, the access to the side portions of the engine is very cumbersome due to the limited space between the engine and the side portions of the motor pan 120.

SUMMARY OF THE INVENTION

One aspect of one or more embodiments of the present invention provides a snowmobile that positions the rider in an improved, more active position on the snowmobile.

Another aspect of one or more embodiments of the present invention provides a snowmobile with a side panel that both protects and encloses the snowmobile's motor and provides a lower leg support for the rider.

Yet another aspect of one or more embodiments of the present invention provides a snowmobile that includes a frame, a motor supported by the frame, an endless drive track supported by the frame and operatively connected to the motor, a straddle type seat supported by the frame, two steering skis supported by the frame, and a side panel connected to the frame. The side panel has a lower leg support that is constructed and arranged to support a snowmobile rider's lower leg.

According to a further aspect of one or more of these embodiments, the side panel is connected to the frame for relative pivotal movement about a side panel axis, and the side panel has open and closed positions relative to the frame. The side panel axis forms an angle with a vertically extending line that is preferably less than 45 degrees, and is more preferably less than 30 degrees. A side of the motor may be accessible when the side panel is in its open position. The side panel may cover a side of the motor when in its closed position.

According to a further aspect of one or more of these embodiments, the lower leg support is rigidly supported by the frame such that lower leg forces exerted on the side panel by the snowmobile rider are transferred to the frame through the side panel.

According to a further aspect of one or more of these embodiments, the snowmobile further includes a starter cord and handle operatively connected to the motor. The side panel preferably includes a hole through which the handle may be accessed to start the motor. The side panel may have an outer surface that surrounds the hole such that when the handle is in a wound position, the handle does not extend outwardly past the outer surface.

According to a further aspect of one or more of these embodiments, the side panel includes a first panel portion that extends generally longitudinally and vertically, a second panel portion that extends laterally inwardly from a rearward end of the first panel portion, the second panel portion defining the lower leg support, and a third panel portion that is generally vertical and extends rearwardly from an inward portion of the second panel portion. The snowmobile may also include a latch mechanism that selectively secures the third panel portion to the frame. The first panel portion is preferably constructed and arranged to be disposed laterally outwardly from the snowmobile rider's leg so as to protect the snowmobile rider's leg during operation of the snowmobile. The third panel portion preferably defines an inner leg support.

According to a further aspect of one or more of these embodiments, the side panel has a knee rest that is constructed and arranged to support the snowmobile rider's knee. The side panel may alternatively and/or additionally include a lower front leg support that is constructed and arranged to support the lower front leg of the snowmobile rider.

Yet another aspect of one or more embodiments of the present invention provides a snowmobile that has a frame, an internal combustion engine supported by the frame, a rewind starter that includes a starter cord and a handle operatively connected to the engine, an endless drive track supported by the frame and operatively connected to the engine, a straddle type seat supported by the frame, two steering skis supported by the frame, and a side panel connected to the frame. The side panel has a hole through which the handle may be accessed to start the engine.

According to a further aspect of one or more of these embodiments, the side panel has an outer surface that surrounds the hole. When the handle is in a wound position, the handle does not extend outwardly past the outer surface. When the handle is in a unwound position, the starter cord passes through the hole.

According to a further aspect of one or more of these embodiments, the side panel is connected to the frame for relative pivotal movement about a side panel axis, and the side panel has open and closed positions relative to the frame. The side panel axis forms an angle with a vertically extending line that is preferably less than 45 degrees, and is more preferably less than 30 degrees. A side of the engine is preferably accessible when the side panel is in its open position. The side panel preferably covers a side of the engine when in its closed position.

Additional and/or alternative aspects, features, advantages, and objects of embodiments of the present invention will be described in or apparent from the following detailed description of preferred embodiments.

BRIEF DESCRIPTION OF THE DRAWINGS

Preferred embodiments of the invention will be described in conjunction with the following drawings, wherein.

DETAILED DESCRIPTION OF PREFERRED EMBODIMENTS

Figure 1:
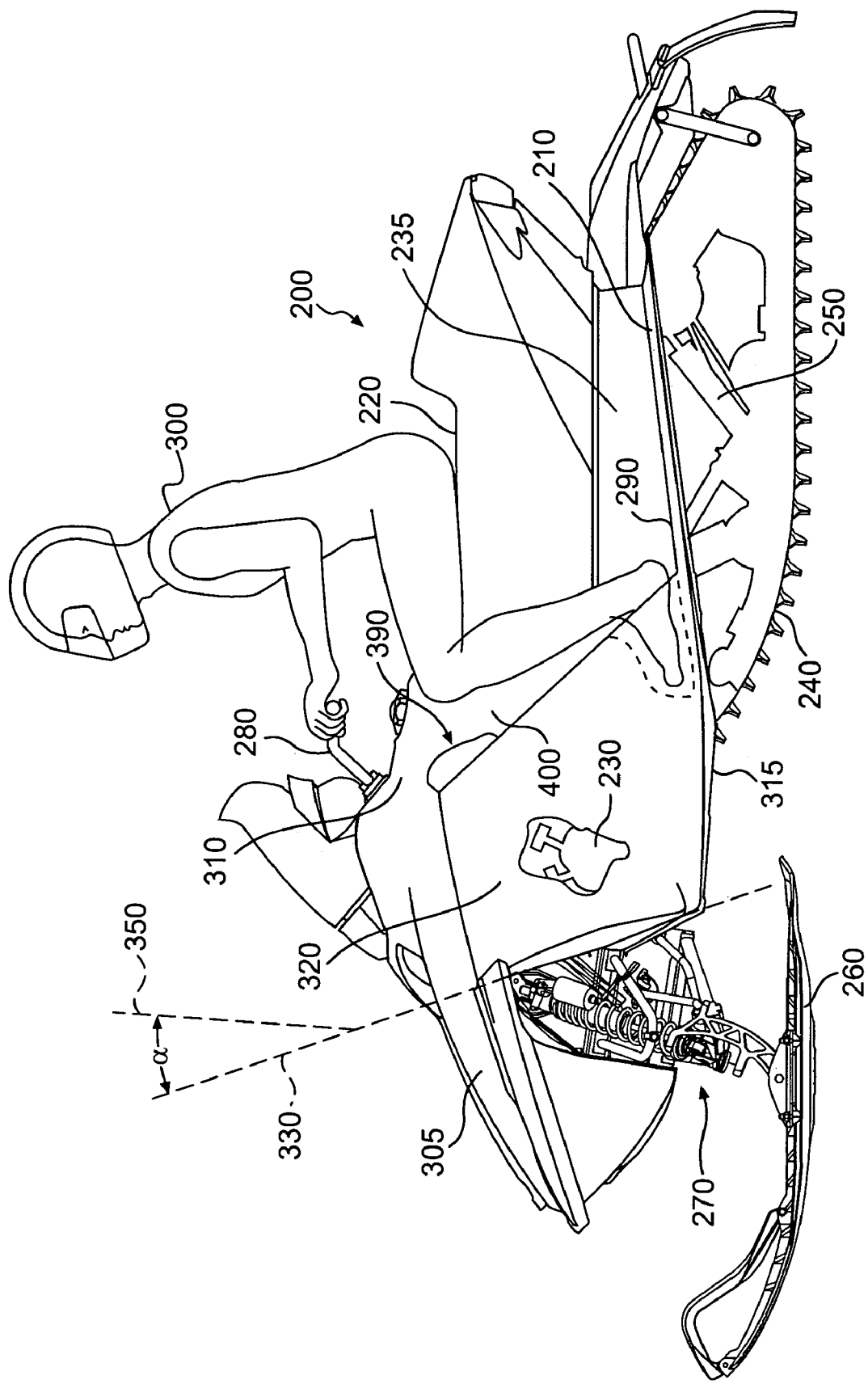
FIG. 1 is a left side view of a snowmobile according to one embodiment of the present invention.

FIG. 1 is a side view of a snowmobile 200 according to one embodiment of the present invention. The snowmobile 200 includes a frame 210. A straddle type seat 220 is constructed and arranged to support a standard rider 300 and is supported by the frame 210. A motor 230 (such as a two or four stroke internal combustion engine) is supported by the frame 210. The frame 210 includes a tunnel 235, which preferably comprises one or more pieces of bent sheet metal that form an inverted channel. An endless drive track 240 is supported by the tunnel 235 through a rear suspension system 250 (such as a slide rail suspension system). The endless drive track 240 operatively connects to the motor 230 to propel the snowmobile 200. Two steering skis 260 are supported by the frame 210 through a front suspension system 270 (such as a pusher arm suspension system or a double A-arm suspension system). The steering skis 260 operatively connect to a steering device 280 such as a handlebar or steering wheel. The tunnel 235 supports a footrest 290 that is constructed to support the feet of the standard snowmobile rider 300.

Figure 9:
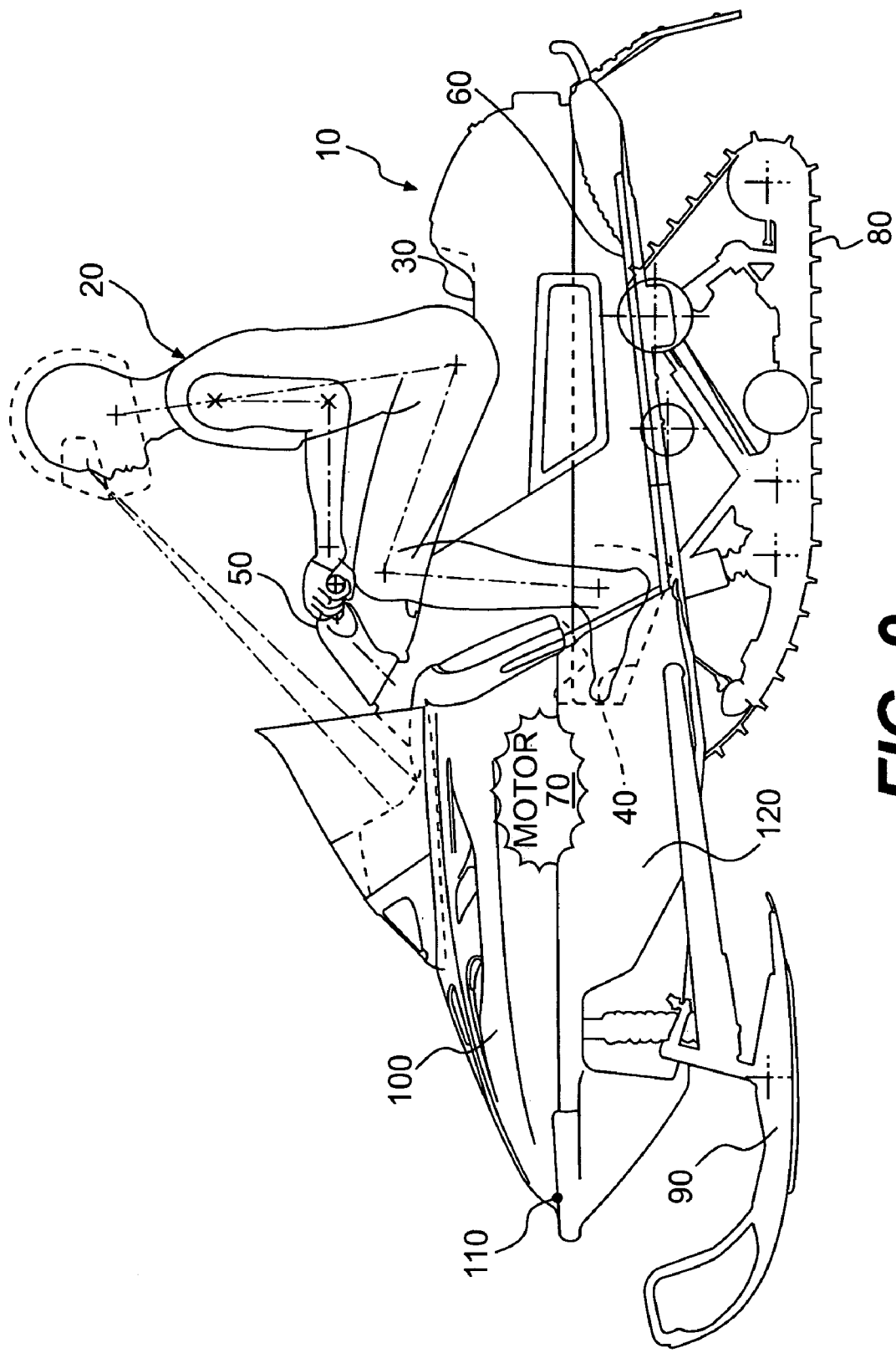
FIG. 9 is a left side view of a snowmobile according to the prior art.

Elements of the snowmobile 200 (such as, for example, the seat 220, frame 210, footrest 290, and steering device 280) are positioned relative to each other so that the standard snowmobile rider 300 who is sitting on the seat 220 in a standard riding position is positioned farther forward on the snowmobile 200 than the snowmobile rider 30 is on the conventional snowmobile 10 (FIG. 9). Furthermore, the rider 300 is preferably positioned in a more active riding position that improves the rider's ability to raise and lower himself using his legs, absorb bumps, and lean into turns.

The inventors of the present invention realized that when the rider 300 is in the position shown on the snowmobile 200, the snowmobile 200 could be designed to further improve the rider's comfort, control, and active positioning if the snowmobile 200 directly supported the rider's lower leg (e.g., his knee, inner leg/thigh, tibia, and/or shin). Accordingly, as described below, the snowmobile 200 is constructed and arranged to support the lower leg of the rider 300.

As shown in FIG. 1, a front fairing 305 and control console 310 enclose an upper side of the motor 230. The fairing 305 is preferably rigidly mounted to the frame 210, but may alternatively be removably mounted to the frame 210 so as to enable easy access to the top of the motor 230. A motor pan 315 is mounted to the frame 210 below the motor 230 to protect and enclose the underside of the motor 230.

Figure 2:
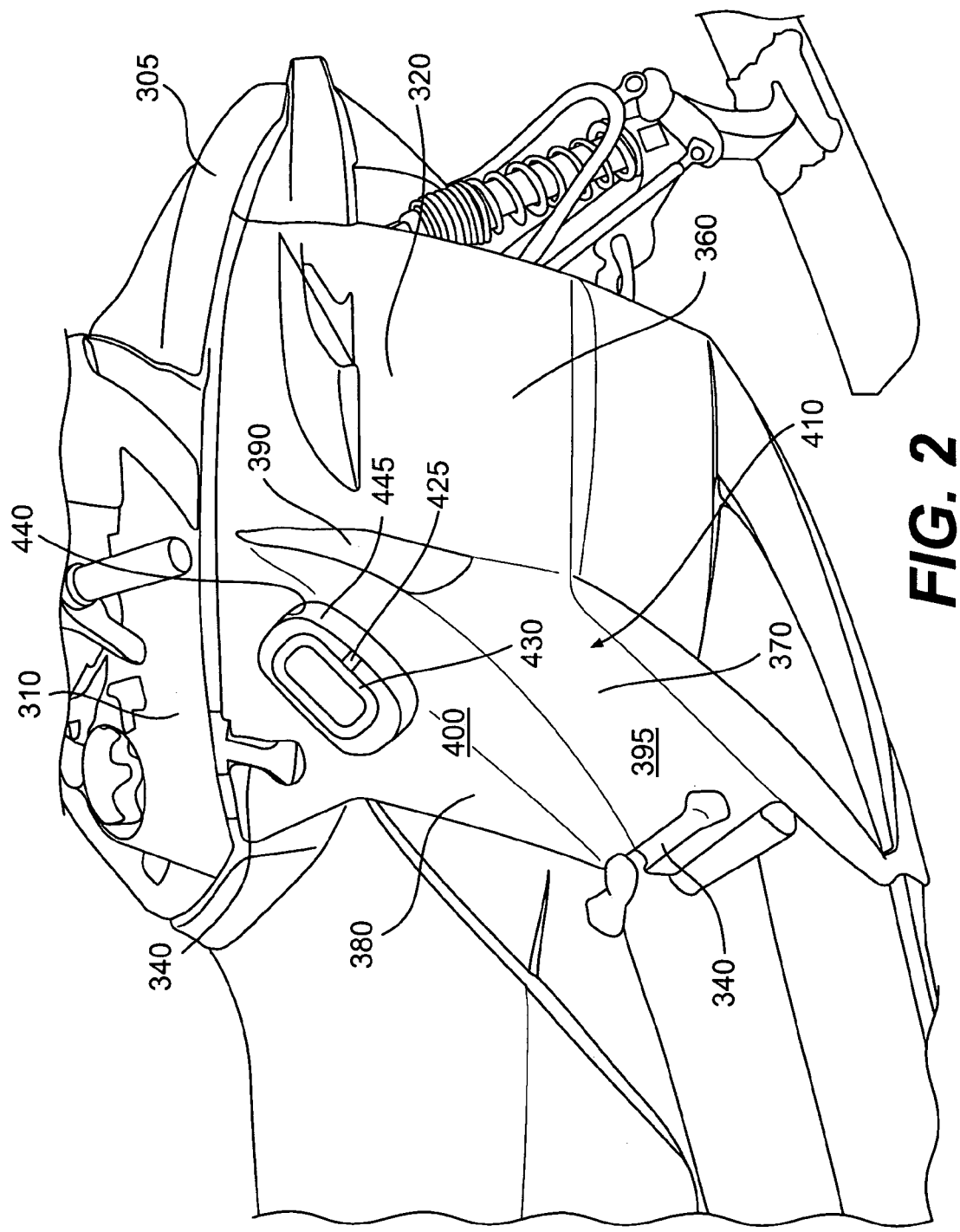
FIG. 2 is a partial right, side, perspective view of the right side of the snowmobile shown in FIG. 1.
Figure 3:
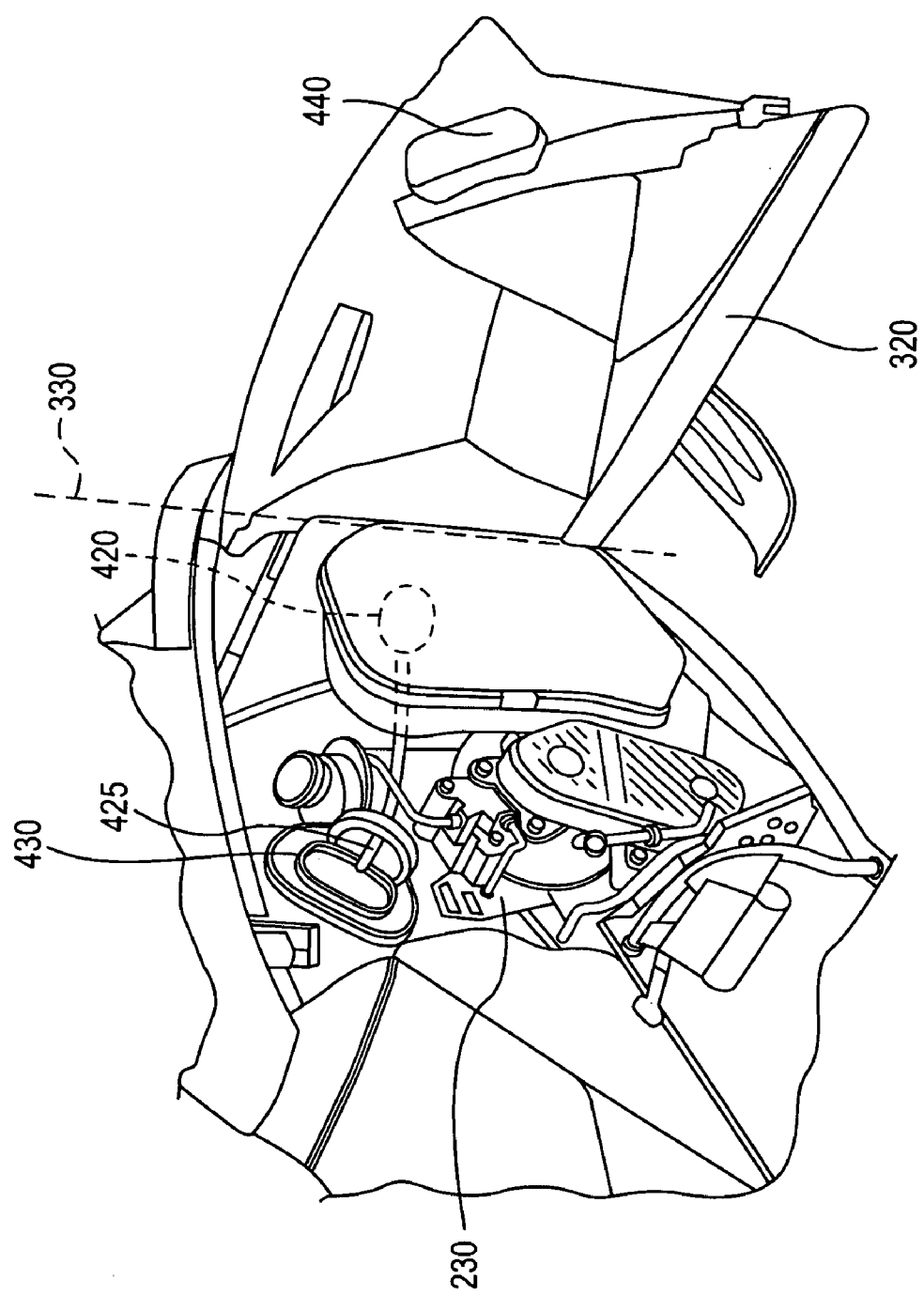
FIG. 3 is a partial right, side, perspective view of the right side of the snowmobile shown in FIG. 1, with a right side panel in an open position.

As shown in FIGS. 1–3, right and left side panels 320 pivotally connect to the frame 210 at side panel pivot axes 330 such that each of the side panels 320 have open and closed positions relative to the frame 210. Because the left and right side panels 320 are generally mirror images of each other, only the right side panel 320 is described in detail. It is to be understood, however, that aside from the noted exceptions (for example, only the right side panel 320 has a rewind starter hole 440), the description of the right side panel 320 also applies to the left side panel 320.

As shown in FIGS. 1 and 2, when the side panel 320 is closed, it encloses and protects a lateral side of the motor 230. An upper edge of the side panel 320 preferably mates with a side edge of the fairing 305 and/or console 310. Similarly, a lower edge of the side panel 320 preferably mates with a side edge of the motor pan 315. Consequently, when the side panels 320 are closed, the side panels 320, motor pan 325, console 310, and fairing 305 protect and enclose the motor 230.

As illustrated in FIG. 3, when the side panel 320 is opened, a lateral side of the motor 230 and other snowmobile 200 components are accessible. As illustrated in FIG. 2, the snowmobile 200 includes a latch mechanism 340 that selectively holds the side panel 320 in its closed position. In the illustrated embodiment, the latch mechanism 340 comprises upper and lower latches. However, a variety of alternative fastening devices (e.g., cotter pins, bolts, straps, etc.) may be used without departing from the scope of the present invention.

As shown in FIG. 1, to enable the side panel 320 to swing generally horizontally between its open and closed positions, the side panel pivot axis 330 preferably extends in a generally vertical direction. Accordingly, an angle α formed between the side panel pivot axis 330 and a vertically extending line 350 is preferably less than 45 degrees and is more preferably less than 30 degrees. The angle α is preferably about 19 degrees.

Figure 10:
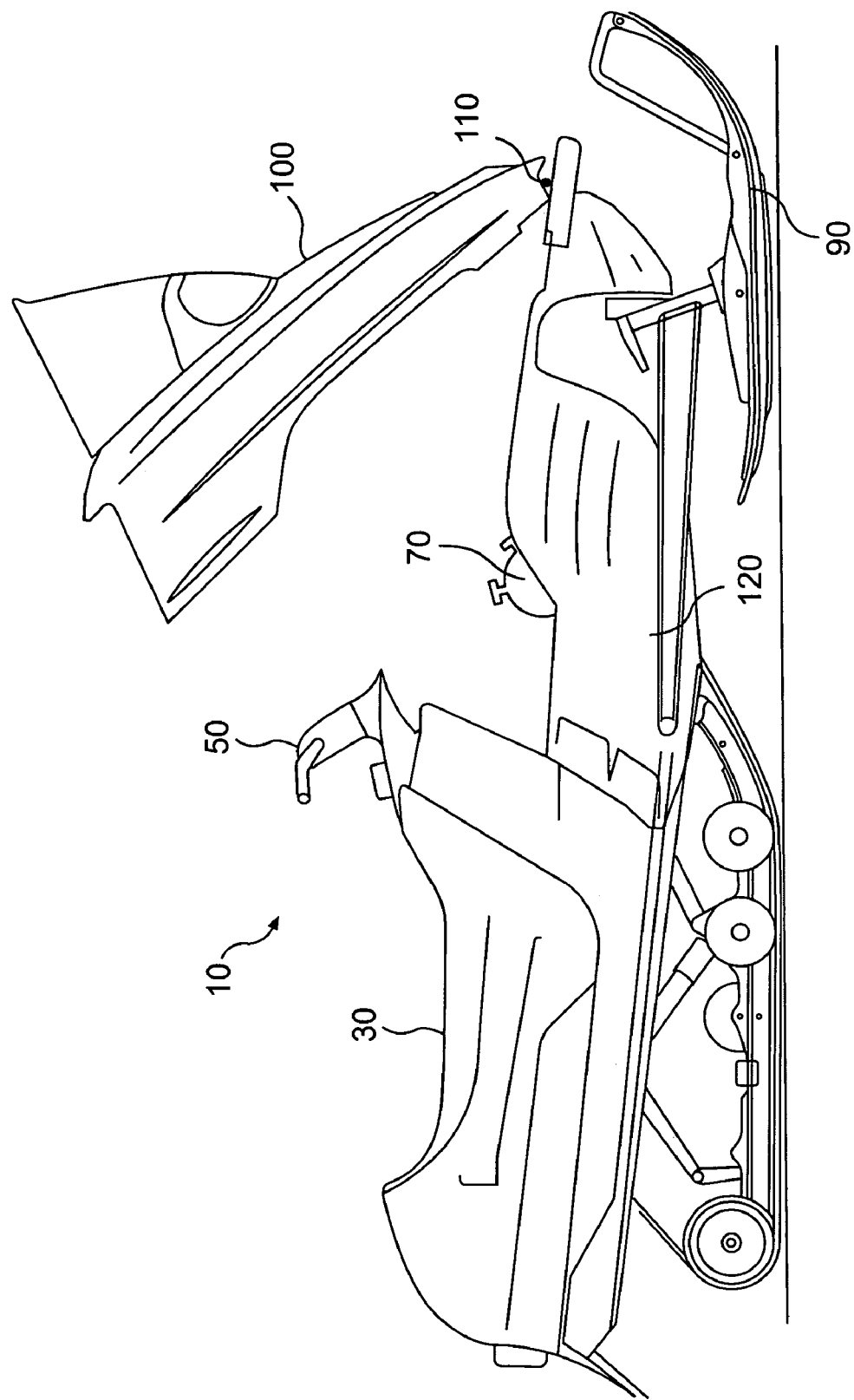
FIG. 10 is a right side view of the snowmobile shown in FIG. 9, with the motor cover in an open position.

While the illustrated side panel 320 mounts to the frame 210 through a pivotal connection and a latch mechanism 340, the side panel 320 may alternatively mount to the frame 210 via a variety of alternative fasteners (e.g., a plurality of latch mechanisms, straps, etc.). The side panel 320 may alternatively be removably mounted to the frame 210. The side panel 320 may alternatively be permanently rigidly mounted to the frame 210 such that the side panel 320 may not be opened. In such an embodiment, alternative means for accessing the motor 230 should be included (e.g., a removable top fairing such as the motor cover 100 shown in FIGS. 9 and 10, etc.).

As illustrated in FIGS. 2–6, the right side panel 320 includes first, second, and third side panel portions 360, 370, 380. The side panel portions 360, 370, 380 are preferably integrally formed and comprise a strong light material such as high-density polyethylene ("HDPE") or polypropylene (PP). However, the side panel 320 may alternative comprise a variety of other strong, light, materials such as gel-coated fiberglass, etc. Alternatively, each of the side panel portions 360, 370, 380 may be separately formed and subsequently connected together. Furthermore, any one or more of the side panel portions 360, 370, 380 may be omitted entirely without deviating from the scope of the present invention.

Figure 5:
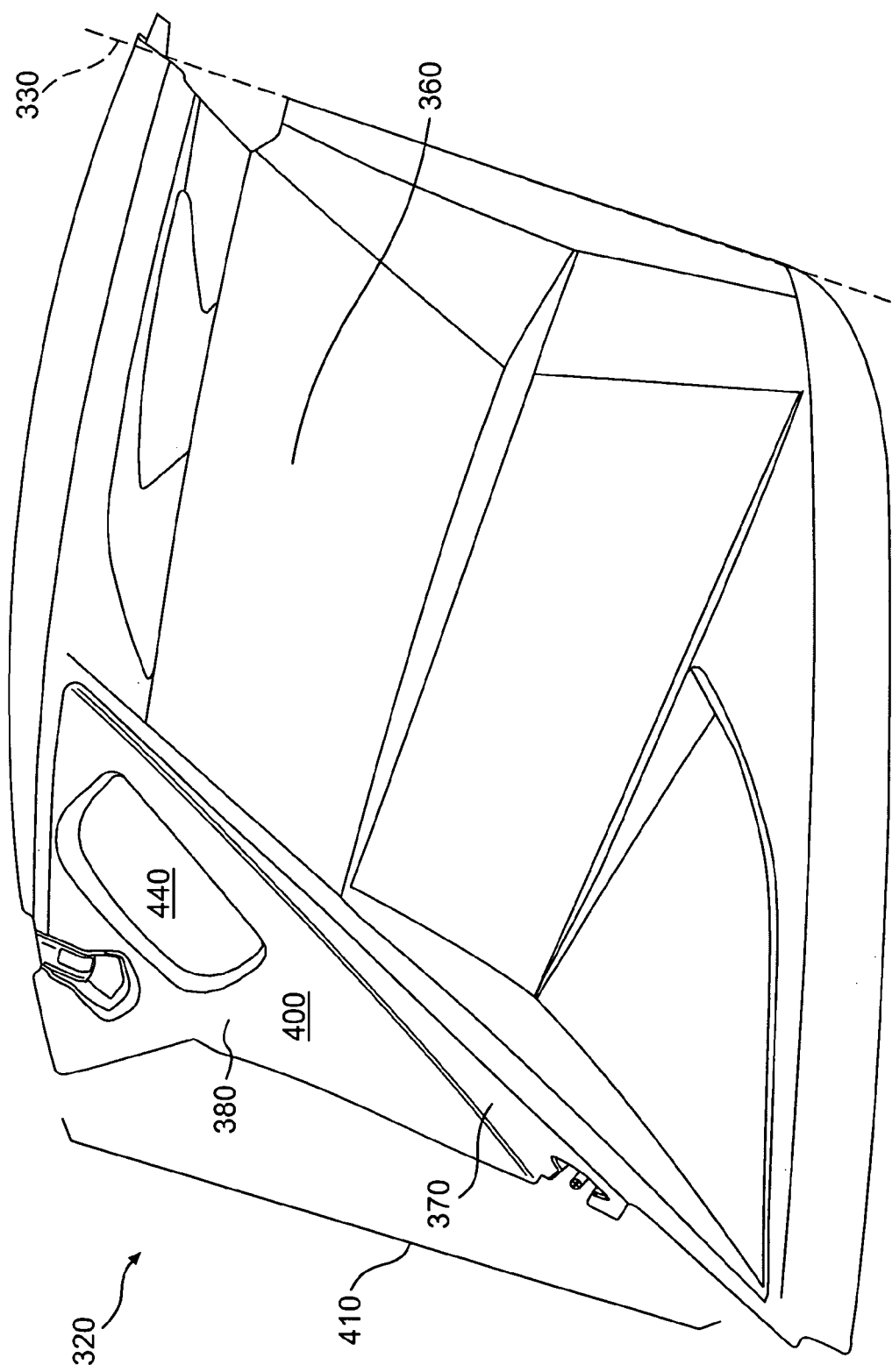
FIG. 5 is a right side view of the right side panel shown in FIG. 4.
Figure 6:
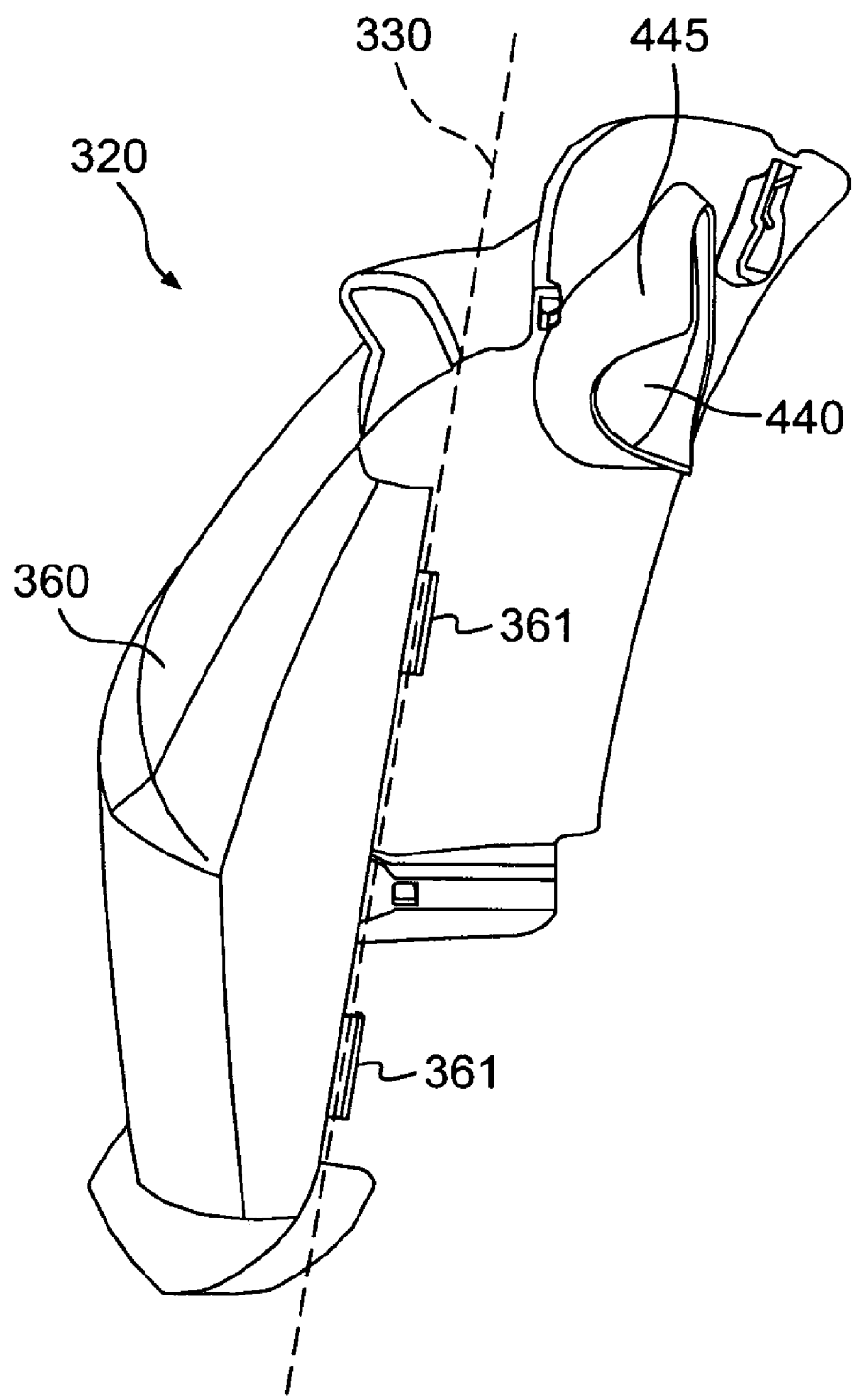
FIG. 6 is a front view of the right side panel shown in FIG. 4.
Figure 7:
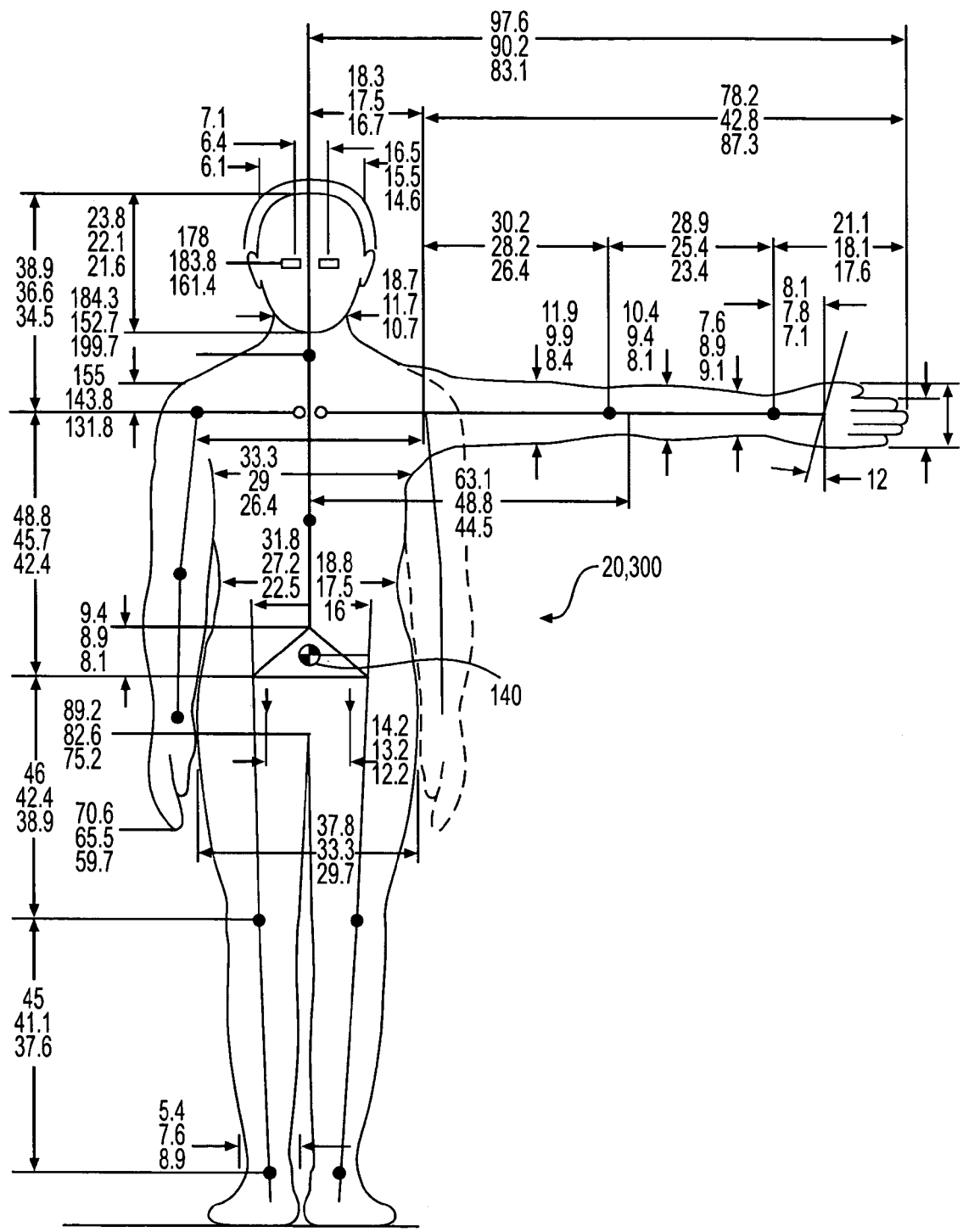
FIG. 7 is a front view of a standard snowmobile rider.
Figure 8:
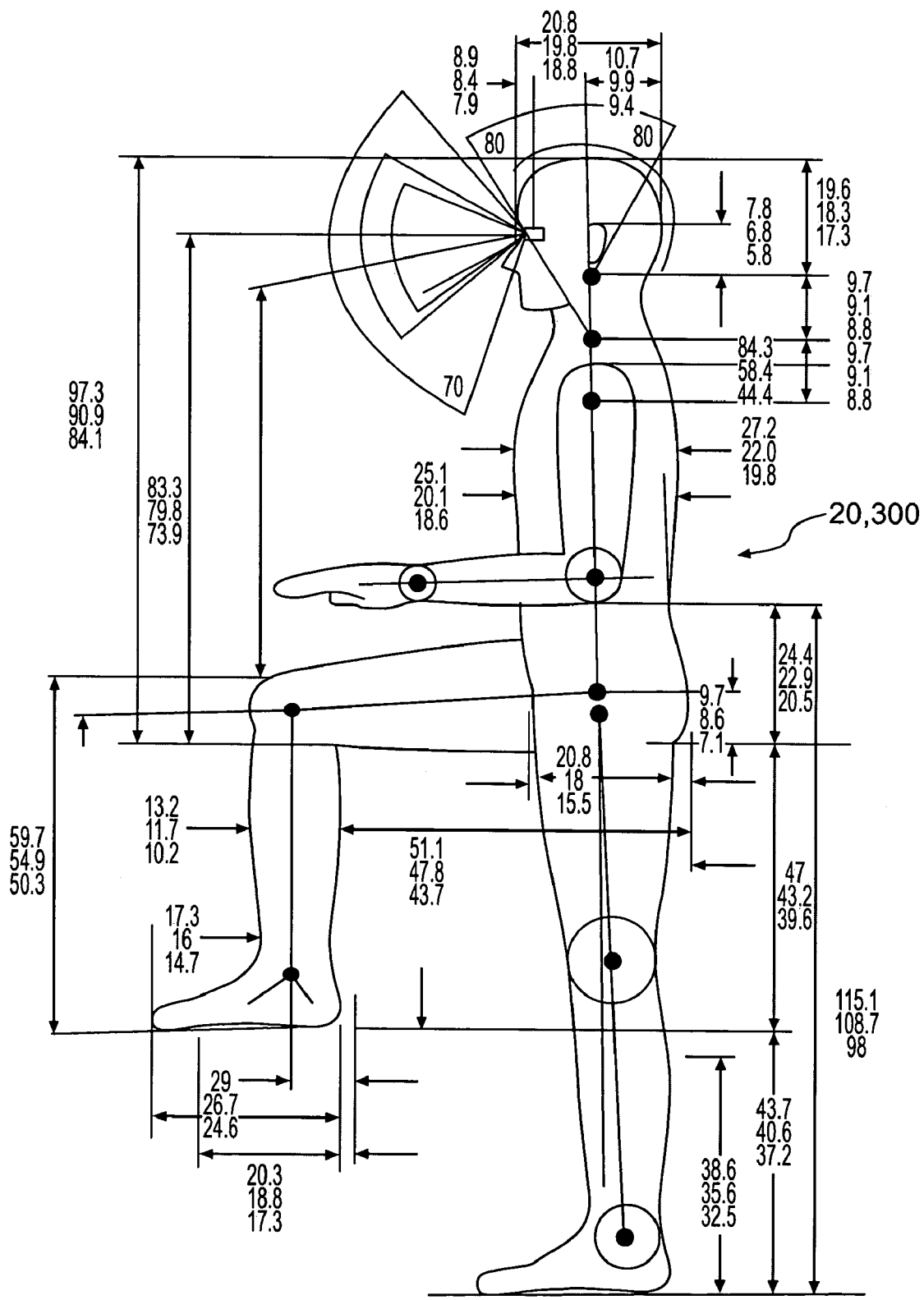
FIG. 8 is a left side view of the standard snowmobile rider shown in FIG. 7.

A forward end of the first side panel portion 360 pivotally connects to the frame about the pivot axis 330. As illustrated in FIG. 6, a plurality of tabs 361 that are disposed on the forward end of the first side panel portion 360 form part of a hinge or other type of pivotal connection that defines the pivot axis 330. As shown in FIG. 5, the first side panel portion 360 is generally vertically oriented and extends rearwardly from the pivot axis 330. The first side panel portion 360 provides a majority of the side enclosure for the motor 230.

Figure 4:
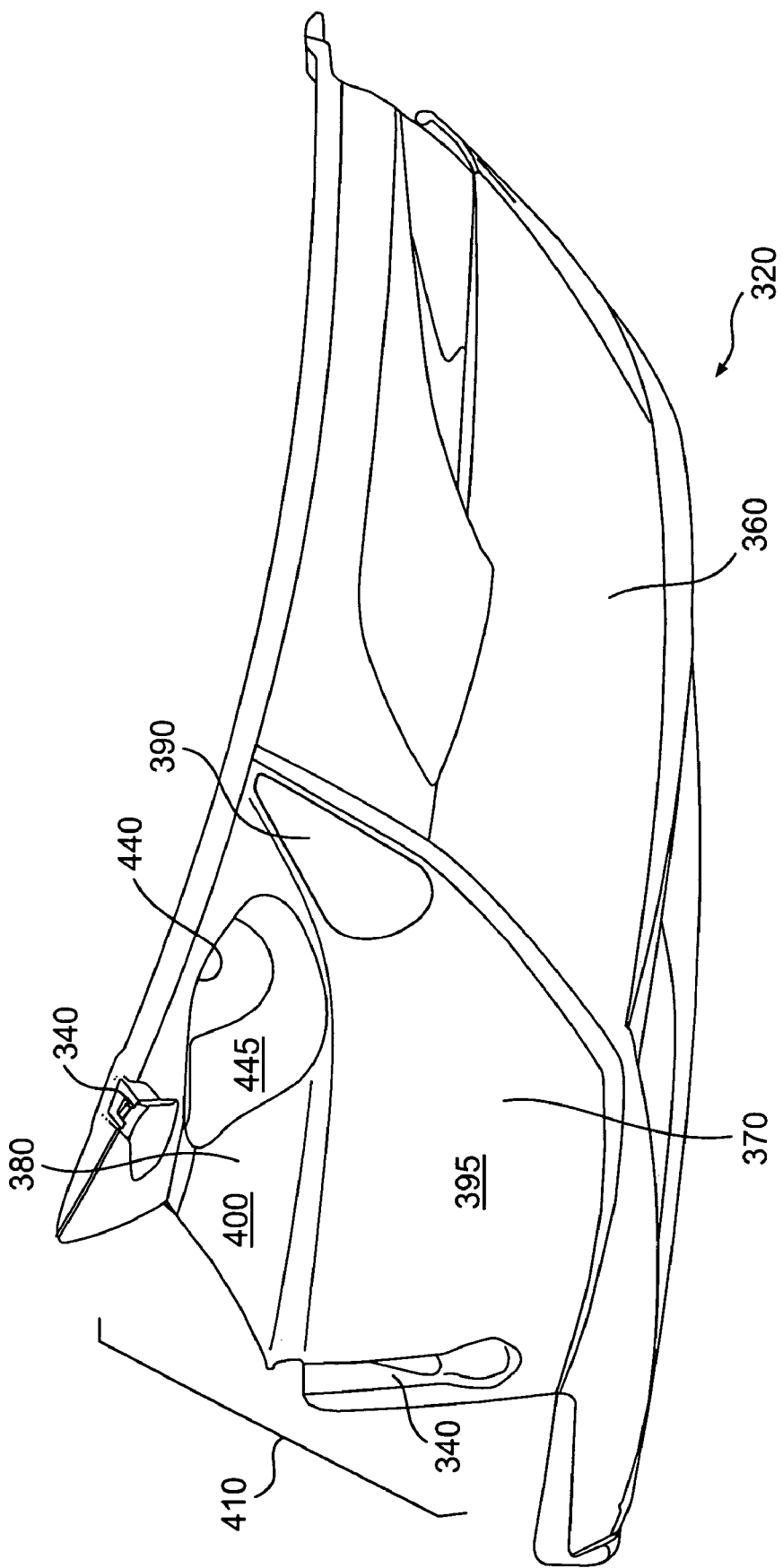
FIG. 4 is a top, right perspective view of the right side panel of the snowmobile shown in FIG. 1.

As shown in FIGS. 2 and 4, the second side panel portion 370 extends laterally inwardly from a rearward end of the first side panel portion 360. The second side panel portion 370 includes a wind deflector 390 toward its upper end. A removable padded knee rest, which may be formed as part of the wind deflector 390, may be applied to an upper portion of the side panel portion 370 to increase the comfort to the driver. The knee rest is preferably positioned at or near where the knee of the rider 300 is positioned during operation of the snowmobile 200. Accordingly, the rider 300 may lean forward (relative to the rider position illustrated in FIG. 1) to support his knees on the knee rest. Similarly, a lower portion of the second side panel portion 370 defines a lower front leg support 395 that is adapted to support the front of the rider's lower leg (e.g., the rider's shin or tibia).

The second side panel portion 370 is constructed and arranged to be at least slightly wider than the rider's legs and extend laterally outwardly beyond the rider's legs when the rider 300 is in the standard riding position. Consequently, the rearward end of the first side panel portion is disposed laterally outwardly from the rider's legs and deflects wind, snow, and other debris away from the rider's legs during the operation of the snowmobile 200.

As shown in FIGS. 2, 4, and 5, the third side panel portion 380 is generally vertically oriented and extends rearwardly from an inner lateral end of the second side panel portion 370. The third side panel portion 380 preferably defines an inner leg support 400 that is constructed and arranged to be disposed at or near the rider's inner legs or thighs. Accordingly, the rider 300 may help position himself by pushing his legs laterally inwardly against the inner leg support 400.

Together, the knee rest, lower front leg support 395, and inner leg support 400 of the side panel 320 define a lower leg support 410. The lower leg support 410 improves the rider's comfort and ability to actively position himself. Any one of the knee rest, lower front leg support 395, and inner leg support 400 may be omitted from the lower leg support 410 without deviating from the scope of the present invention.

As illustrated in FIG. 2, a lower part of the latch mechanism 340 secures the lower part of the second side panel portion 370 to the frame 210. Similarly, an upper part of the latch mechanism 340 secures an upper part of the third side panel portion 380 to the frame 210. The latch mechanism is preferably recessed relative to the outer surface of the second and third side panel portions 370, 380 such that the latch mechanism does not interfere with the rider's ability to comfortably rest his legs against the side panel 320. The latch mechanism 340 may alternatively connect between other portions of the side panel 320 and frame 210 without deviating from the scope of the present invention.

In the illustrated embodiment, the integrally formed side panel portions 360, 370, 380 strengthen each other because of the various angles formed between the side panel portions 360, 370, 380. Accordingly, the side panel 320 can effectively withstand the loads exerted by the rider 300 on the lower leg support 410 without the need for additional reinforcing structures in the area of the lower leg support 410. The side panel 320 transfers the forces exerted on the lower leg support 410 to the frame through the latch mechanism 340 and the pivotal connection formed between the side panel 320 and the frame 210.

Alternatively, the first side panel portion 360 may be formed separately from the second and third side panel portions 370, 380. In such an embodiment, only the first side panel portion 360 would pivot relative to the frame 210 to enable access to the motor 230. The second and third side panel portions could rigidly mount to the frame. Because the first and second side panel portions would be latched together, rather than integrally formed, the second side panel portion 370 might less effectively transfer knee loads to the first side panel portion 360 and frame 210. Accordingly, additional reinforcing structures may need to be provided between the frame 210 and the second side panel portion 370 to ensure that the lower leg support 410 is rigid enough to withstand the forces exerted on it by the rider 300.

In the embodiment illustrated in FIG. 3, the motor 230 is an internal combustion engine that includes an electric starter (not shown). In case the electric starter fails, however (due to battery discharge, etc.), a rewind starter 420 (FIG. 3) is also provided. The rewind starter 420 includes a cord 425 and a handle 430. As shown in FIGS. 2 and 6, hole 440 is formed in the third side panel portion 380 to enable the rider 300 to access and use the rewind starter 420 without opening the side panel 320. The hole 440 is preferably defined by sides 445 that are recessed relative to an outer surface of the third panel portion 380. When the rewind starter 420 is in its rewound position, the handle 430 preferably does not extend outwardly past the outer surface of the third side panel portion 380. Accordingly, the starter handle 430 does not interfere with the rider's comfortable use of the third side panel portion 380 as the inner leg support 400.

While the hole 440 is disposed in the third side panel portion 380 of the left side panel 320 in the illustrated embodiment, the hole 440 and accompanying starter handle 430 may alternatively be positioned in a variety of other locations. For example, the rewind starter 420 may be disposed on the right side of the snowmobile 200 and the accompanying hole 440 may be disposed on the right side panel 320. Furthermore, the hole 440 may be positioned in any part of the side panel 320 (e.g., in the first or second side panel portions 360, 370, between two of the side panel portions 360, 370, 380, etc.) without deviating from the scope of the present invention.

While preferred embodiments of the invention have been shown and described with reference to the accompanying figures, it is evident that variations and modifications are possible that are within the spirit and scope of the preferred embodiments described herein. In addition, while the side panel has been described with reference to use with a snowmobile, most if not all the features of the side panel could be applied to other environments as well, such as for other vehicles, or for securing members that are movable with respect to one another.

What is claimed is:

1. A snowmobile comprising:
a frame;
a motor supported by the frame;
an endless drive track supported by the frame and operatively connected to the motor;
a straddle seat supported by the frame;
two steering skis supported by the frame;
a side panel supported on the snowmobile so as to be capable of relative pivotal movement about a side panel axis,
the side panel having open and closed positions relative to the snowmobile,
the side panel having a lower leg support that is constructed and arranged to support a snowmobile rider's lower leg.

2. The snowmobile of claim 1, wherein:
the side panel is connected to the frame.

3. The snowmobile of claim 1, wherein the side panel axis forms an angle with a vertically extending line that is about 19 degrees.

4. The snowmobile of claim 1, wherein a side of the motor is accessible when the side panel is in the open position.

5. The snowmobile of claim 1, wherein the side panel covers a side of the motor when in its closed position.

6. The snowmobile of claim 1, wherein the lower leg support is rigidly supported by the frame such that lower leg forces exerted on the side panel by the snowmobile rider are transferred to the frame through the side panel.

7. The snowmobile of claim 1, wherein the side panel comprises: a first panel portion that extends generally longitudinally and vertically; a second panel portion that extends laterally inwardly from a rearward end of the first panel portion, the second panel portion defining the lower leg support; and a third panel portion that is generally vertical and extends rearwardly from an inward portion of the second panel portion.

8. The snowmobile of claim 7, further comprising a latch mechanism that selectively secures the third panel portion to the frame.

9. The snowmobile of claim 7, wherein the first panel portion is constructed and arranged to be disposed laterally outwardly from the snowmobile rider's leg so as to protect the snowmobile rider's leg during operation of the snowmobile.

10. The snowmobile of claim 7, wherein the third panel portion defines an inner leg support.

11. The snowmobile of claim 1, wherein the side panel has a knee rest that is constructed and arranged to support the snowmobile rider's knee.

12. A snowmobile comprising:
a frame;
a motor supported by the frame;
an endless drive track supported by the frame and operatively connected to the motor;
a straddle seat supported by the frame;
two steering skis supported by the frame;
a side panel supported on the snowmobile, the side panel having a lower leg support that is constructed and arranged to support a snowmobile rider's lower leg,
a starter cord and handle operatively connected to the motor, the side panel including a hole through which the handle may be accessed to start the motor.

13. The snowmobile of claim 12, wherein: the side panel has an outer surface that surrounds the hole, when the handle is in a wound position, the handle does not extend outwardly past the outer surface, and when the handle is in a unwound position, the starter cord passes through the hole.

14. The snowmobile of claim 12, wherein:
the side panel s capable of relative pivotal movement about a side panel axis, and
the side panel has open and closed positions relative to the snowmobile.

15. The snowmobile of claim 14, wherein the side panel axis forms an angle with a vertically extending line that is about 19 degrees.

16. The snowmobile of claim 14, wherein a side of the motor is accessible when in its open position.

17. The snowmobile of claim 14, wherein the side panel covers a side of the motor when in its closed position.

18. The snowmobile of claim 12, wherein the lower leg support is rigidly supported by the frame such that lower leg forces exerted on the side panel by the snowmobile rider are transferred to the frame through the side panel.

19. The snowmobile of claim 12, wherein the side panel comprises:
a first panel portion that extends generally longitudinally and vertically;
a second panel portion that extends laterally inwardly from a rearward end of the first panel portion, the second panel portion defining the lower leg support; and
a third panel portion that is generally vertical and extends rearwardly from an inward portion of the second panel portion.

20. The snowmobile of claim 19, further comprising a latch mechanism that selectively secures the third panel portion to the frame.

21. The snowmobile of claim 19, wherein the first panel portion is constructed and arranged to be disposed laterally outwardly from the snowmobile rider's leg so as to protect the snowmobile rider's leg during operation of the snowmobile.

* * * * *